United States Patent [19]

Alvarez Fernandez

[11] Patent Number: 5,671,663
[45] Date of Patent: Sep. 30, 1997

[54] SELF-CONTAINED AUTOMATIC CITRIC JUICE EXTRACTING AND DISPENSING

[75] Inventor: Jose Angel Alvarez Fernandez, Oviedo, Spain

[73] Assignee: Contractfin, A.G., Vaduz, Liechtenstein

[21] Appl. No.: 605,220

[22] PCT Filed: Sep. 1, 1994

[86] PCT No.: PCT/ES94/00083
§ 371 Date: May 28, 1996
§ 102(e) Date: May 28, 1996

[87] PCT Pub. No.: WO96/06541
PCT Pub. Date: Mar. 7, 1996

[51] Int. Cl.$^6$ ........................................... A23N 1/00
[52] U.S. Cl. ........................... 99/489; 99/486; 99/510
[58] Field of Search ............... 99/495–513, 545, 99/486–489; 100/111, 131, 213, 108, 98 R, 218; 221/2, 6, 7, 129, 131

[56] References Cited

U.S. PATENT DOCUMENTS

4,706,793 11/1987 Awane et al. .................. 221/2
5,445,068 8/1995 Michelson ...................... 99/504
5,483,870 1/1996 Anderson et al. ............... 99/510

*Primary Examiner*—Timothy F. Simone
*Attorney, Agent, or Firm*—Young & Thompson

[57] ABSTRACT

A self-contained automatic citric juice extracting and dispensing machine of the type of public service machines dispensing consumable liquid and solid products. The citric juice extracting and dispensing machine is based on an electronic circuit having a microprocessor, which controls a series of devices, which provide for the sorting and allocation of citric fruits. When reaching an internal squeezer, the citric fruits are mechanically cut and squeezed. The amount of juice selected by a user is received in a cup provided by the machine. The machine internally provides for both the expulsion of residue and waste as well as the internal cleaning and washing of the parts soiled by the extracting operation or passage of the juice.

6 Claims, 8 Drawing Sheets

SELF-CONTAINED AUTOMATIC CITRIC JUICE EXTRACTING AND DISPENSING

FIELD OF THE INVENTION

This invention deals with presenting a citric juice extracting system within the framework of a public dispensing machine.

BACKGROUND OF THE INVENTION

It is well-known that there exist citric juice extractors with electric-electronic control, ever since the appearance of the first domestic robots of small size which gave an axis the necessary rotational force to rub against the inside of the citric fruit, situated over the axis of a body which dealt with pressing and dragging as it turned the inside of the citric fruit which was held firm over the said body, straining the juice produced by the said action through the base of the said juice extracting unit. This mechanism was originally controlled by pushing a button, but later evolved to a system where it was only necessary to press the citrus fruit vertically upon the revolving extracting body, which had two stable positions, and upper stop position, and a lower one driving the axis.

This type of domestic robot, had its parallel in industrial citric juice extracting machines, with subsequent packing for distribution and sales.

Alongside certain dispensing mechanisms for edible liquids or solids, such as coffee, confectionary, etc. juice dispensers appeared, which contained the product to be served in reserves inside the machine, which by means of an electronic selection system combined, for example in the case of coffee machines, a mix of suitable proportions for the selection of the liquid coffee and the milk contained in its stores. The same happened with the juice dispensing machines, in which the juice of various fruits was stored pre-pressed, in respective stores or containers, pouring the liquid into a cup, after selection.

The problem of the aforementioned dispensing machines lay in the number of times the machine was under-used, which meant the liquid or juice lay stagnant for a long time, which caused a gradual deterioration of the product, at times even reaching the point of being unfit for consumption.

SUMMARY OF THE INVENTION

This problem is one of those which has led to the creation and invention of the machine subject of this report. In the machine of this invention the risk described above has been removed by incorporating a citric unit storage device and subsequent extraction mechanism for the fruit, so that at all times fresh citric juice is obtained, in the knowledge that juice contained in citric fruit keeps longer than once extracted. In the machine of this invention citric fruit, preferably of diameters between 86 and 80 millimeters may be stored; approximately 384 pieces of fruit may be stored, while all the interior devices are fitted inside an external casing of similar dimensions to coffee or canned soft drink dispensers.

BRIEF DESCRIPTION OF THE DRAWINGS

To better understand the subject of this invention, a practical model of the invention has been proposed in the annexed drawings. In the drawings.

DESCRIPTION OF THE PREFERRED EMBODIMENT

Figure 1:
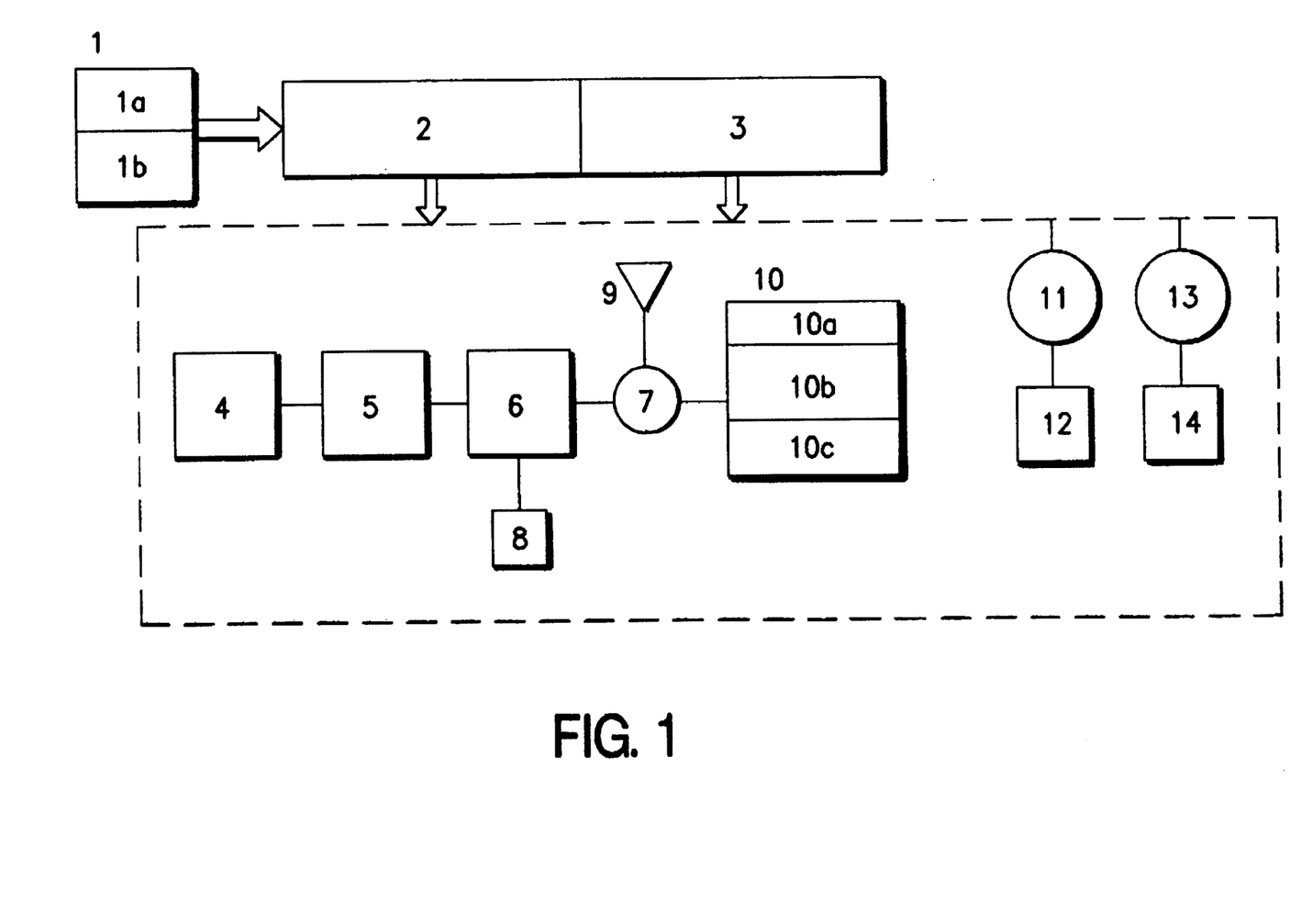
FIG. 1 is a block diagram containing the mechanisms which form the machine of the invention.

As illustrated in FIG. 1, the machine consists of a series of modules which, once assembled, allow, by the insertion of coins for its operation, having placed pieces of citric fruit in the corresponding internal stores, a cup of citric juice to be obtained from the machine.

In the said FIG. 1, the module identified as (1) will be the money mechanism, which (1) allows the possibility of using the machine subject of this invention either by inserting coins into the device (1a) or by inserting the user's credit card into the device (1b). The acceptance of coins or credit cards will be supervised by an electronic controller (3), which, like the rest of the control devices, will consist of a PC-type computer, to be described below. The said electronic controller (3) will also control the electronic supply equipment which will supply the various devices contained within the system. The modules described up to now, form the control part of the system; we now move on to describe the physically operating modules which directly influence the result of the machine.

Figure 4:
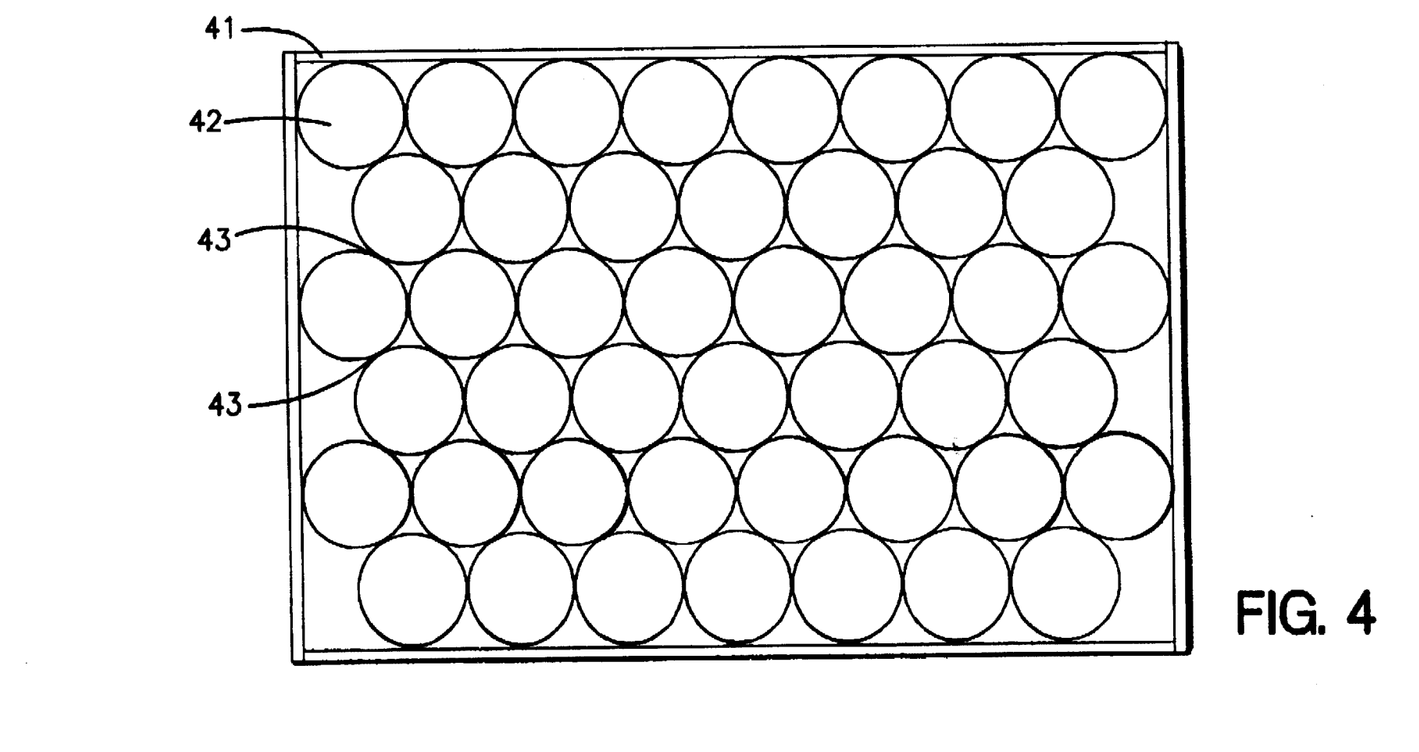
FIG. 4 is a cross-section of the citric fruit store.

Thus, there if a first, citric unit container module (4), which consists of a frame (41) of stainless steel with finishing surface treatment and plastic finishing, which bear an alternating grid of 48 tubes (42) manufactured in PVC, preferable of a diameter of 90 millimeters, with a preferably length of 640 millimeters, as can be seen in FIG. 4. The tubes are fixed together with contact adhesive (43), which avoids any relative displacement between them.

Figure 5:
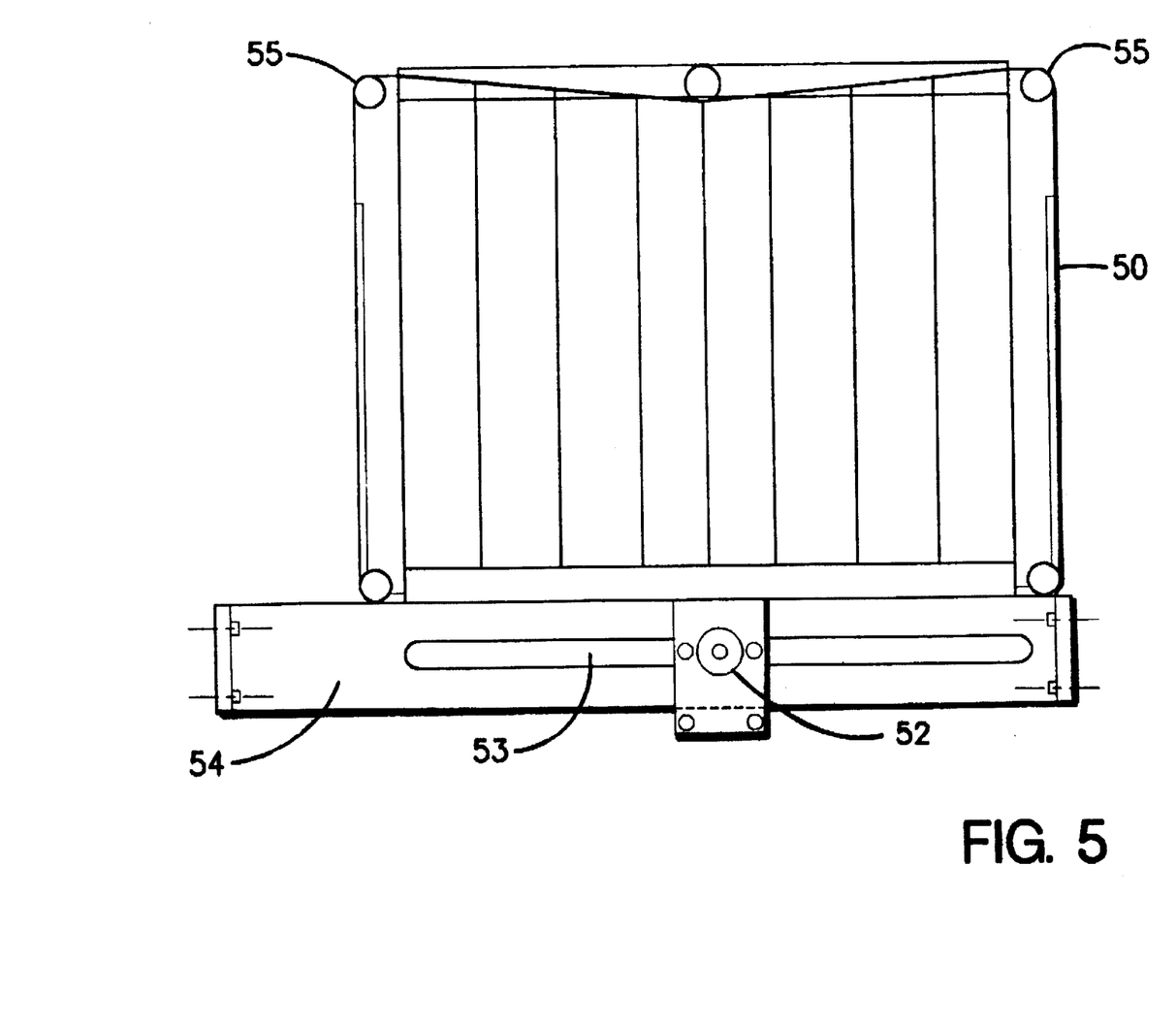
FIG. 5 is a front view of the dispensing device of the machine subject of this invention.
Figure 6:
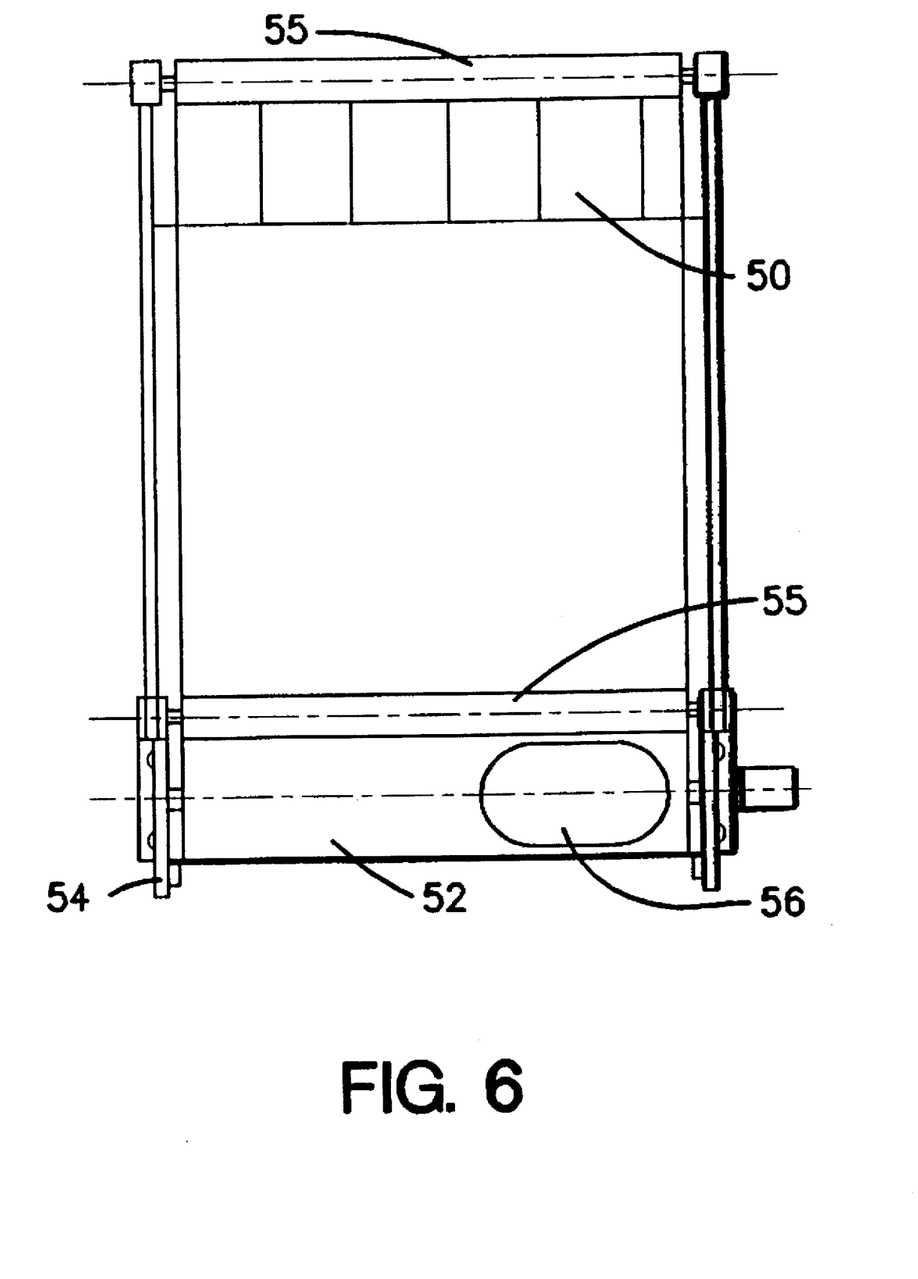
FIG. 6 is a side view of the machine subject of this invention.

Next, the module (5) or citric unit dispenser, has been located in the machine, the contents of which are explained in greater detail in FIGS. 5 and 6; this consists of two bands of reinforced PVC, the preferable dimensions of which are 800 millimeters by 500 millimeters, 90 millimeters apart, which are fastened to a toothed band which is moved by a geared motor unit, or a continuous or step-by-step motor, shuttling between the two longitudinal sides of the storage unit (4). Between the two bands, a rotor with six cavities is housed, where the citric fruits will be placed one by one as the said cavities match up with the citric unit storage tubes (42). Thus, the citric fruit contained in the tubes (42) of the store (4) will be steadily distributed, one by one, to the juice extracting module (6).

The juice extracting device (6) consists of a tube down which the citric fruit runs from the feeder (5) to the top of the aforesaid juice extracting device (6), consisting of a tube, of a lesser diameter than the first, through which move two pistons and the citric unit-cutting blades.

Parallel to the juice extracting device (6), the system has been equipped with a cleaning device (8) for the juice extracting device (6), which, via an orifice opened in the extracting system, injects water under pressure for the periodic cleaning of the compression chamber, this cleaning cycle being self-contained and depending upon the use of the juice extracting device (6). When the cleaning cycle begins, water will be pumped, cleaning the chamber, pipes and pump through which the juice runs, ending up in a three-way valve close to the juice outlet of the machine, which will divert the flow to an unloading tank.

Once the citric units have been squeezed, the juice passes to a hopper. Once finished, it is pumped to a cup situated in the machine and accessible from outside. Thus, the juice passes to the receiving hopper of the juice pumping unit (7) which will deliver the juice via the juice container (10b) of the refrigeration chamber (10) to a cup situated outside the machine, using to this end the suction and driving pipes of the product, a peristaltic pump and a three-way electrically operated valve, being assisted externally by an air compressor (9) for sucking and driving the liquid.

The refrigeration chamber (10), moreover, will contain two more containers deployed to accept on the one hand citric remains (10c) and on the other, water (10c).

In parallel, the system provides cups and sugar contained in sachets, stored respectively in (11) and (13), which are ejected via the dispenser modules (12) and (14) respectively. The means of ejection in both dispensers is based in a ramming mechanism consisting of either a rack and pinion geared motor outfit or an hydraulic micro-cylinder.

Figure 2:
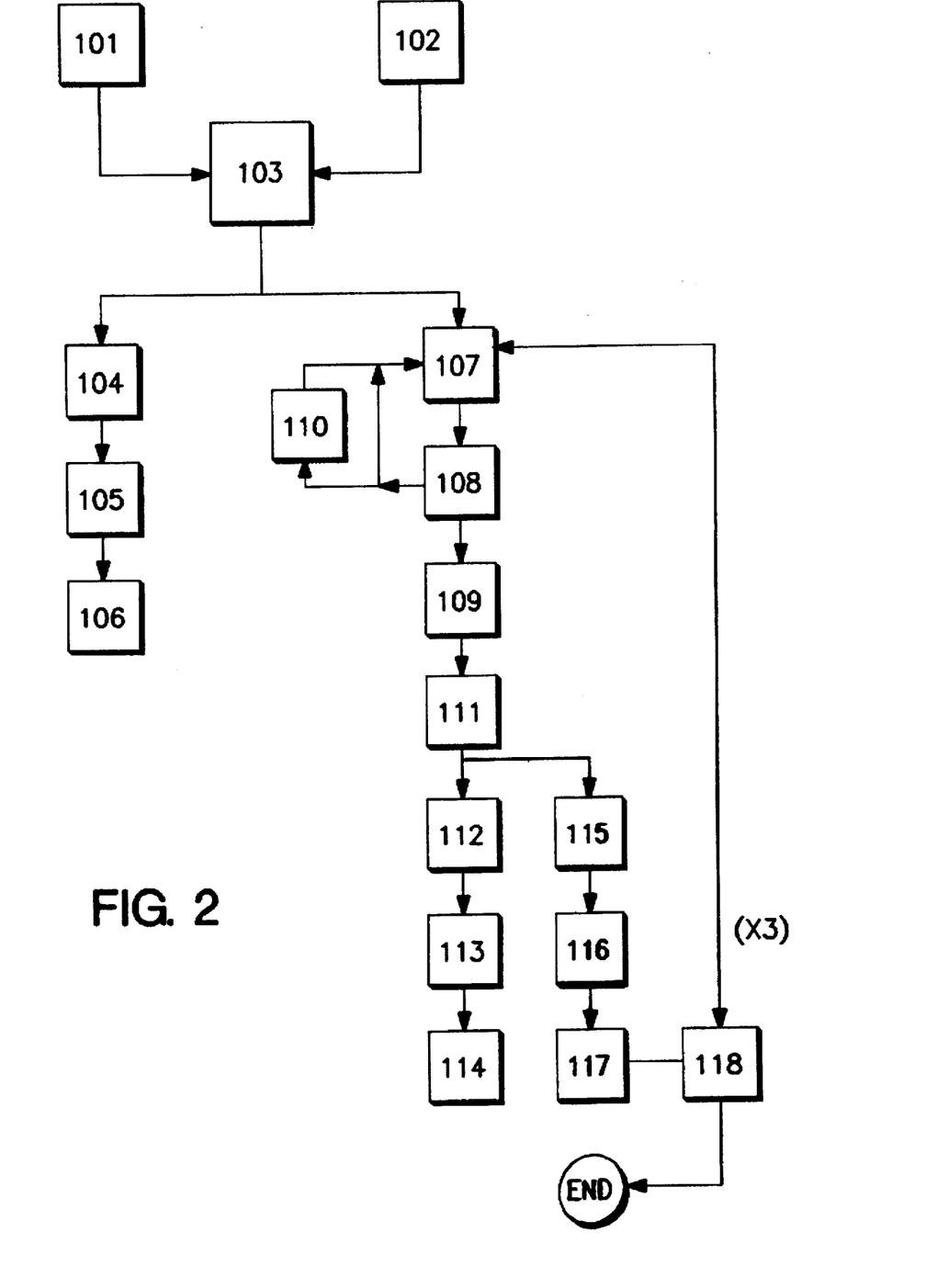
FIG. 2 is a flow chart referring to the sequence of operation of the machine of the invention.

The operation of the machine has been summarised in a flow chart like that described in FIG. 2 referring to the basic working of the electronic circuits forming the system. To realize the said controls the system will be equipped with a series of magneto-thermal protectors, for differential or earth leaks and for over-voltage; the AC grid will supply the different pieces of powered equipment, either in AC or in direct current for motors, pumps, etc., as well as the electronic circuits via a switching supply. The drive power of the equipment will be supplied through relays and contactors, controlled by the electronic component.

The drives of the system, which will be controlled from the electronic component, will be: the air compressor, the refrigerator cabinet, the cabinet lighting, the electrically operated valves of the squeezing pistons, the citric unit collection motors in the feeder, the cleaning pump for the juice extracting device and its piping, the electrically operated valve which will distinguish the cleaning cycle from the normal operating cycle, the sugar dispenser, the cup dispenser, the magnetic card reader, the coin collector, a selection and error indicator display, a modem or data terminal attached to the magnetic card reader, a detector of liquid output from the machine and a cup placement sensor. The electronic control component will be based on an industrial PC-type computer, which will consist of an industrial microprocessor at 31 megahertz speed, with 512 kilobytes of random access memory, a virtual disk with dual ROM and RAM program with battery, a real-time clock with battery, to RS-232 series ports, two parallel ports, two cards with eight opto-isolated digital inputs and eight digital outputs and watch-dog circuit to re-start the system in the case of serious failure.

The software with which the control electronics have been equipped is planned to distinguish two parallel processes, namely that of external of physical action, in the normal juice extracting cycle, and the machine's internal cleaning cycle.

The normal cycle is defined by the flow chart in FIG. 2. The cycle will begin with the insertion either of coins (101) or of a magnetic card (102), followed by validation (103) by the electronic system. Following validation (103), the cup dispensing system (104) will be activated, which will activate the cup placement sensor (105), which will allow the sugar sachet and spoon dispenser mechanism (106) to be activated. Alongside these steps (104), (105) and (106), the motor will be started to move the axle of the six-orifice drum of the citric unit dispenser (107), detecting the passage of the citric unit and inserting the citric unit into the extracting device (109). Should the sensor not detect the passage of the citric unit as it passes (108), the cylinder will be driven again, being allowed to rotate 120 degrees. If the response is still negative, the action will be repeated again. If, even so, there is still no affirmative signal of the passage of citric unit a new motor will be activated (110) to permit the drum or cup set to be moved forward to a spot where the citric unit store has stock to load the aforementioned dispenser drum or cup.

Once step (109), of inserting the citric unit into the juice extracting device, is reached, the activation signal will be given to the ram (111), to subsequently give the signal to cut and squeeze the citric unit (112). The liquid obtained shall be pumped (113), coming out finally at the external output and falling into the cup (114).

Alongside step (112), the reverse steps will be applied in the extracting mechanisms to prepare the said device for the next extraction, drawing back the retention piston (115), dropping the citric remains into their container (116) and placing the pistons in their initial position (117). Given that it is planned for the extraction of three citric units to be the equivalent of one cup of juice, step (118) will cause the sequence to be repeated from step (107), ending (118) the cycle following the third repetition (119).

Figure 3:
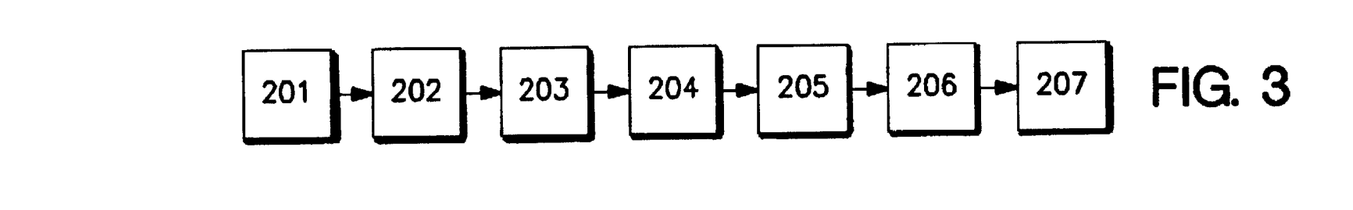
FIG. 3 is a flow chart of the internal cleaning process of the machine.

After a certain time passes without extraction or after a certain number of extraction cycles, the system will automatically activate a cleaning cycle as shown in FIG. 3. In this cycle, the start is caused by a signal (201) coming from the control electronics, after which the three-way valve will be switched and water will be transferred from the water container (202), being sucked into the water pump (203), which will pass it to the jets situated in the juice extracting device (204), at the same time opening the pistons and allowing the water to pass through the pump and the juice pipes or channels (205), ending up finally in a container for water and citric remains (206), stopping the pump (207), and switching back the three-way valve.

Figure 7:
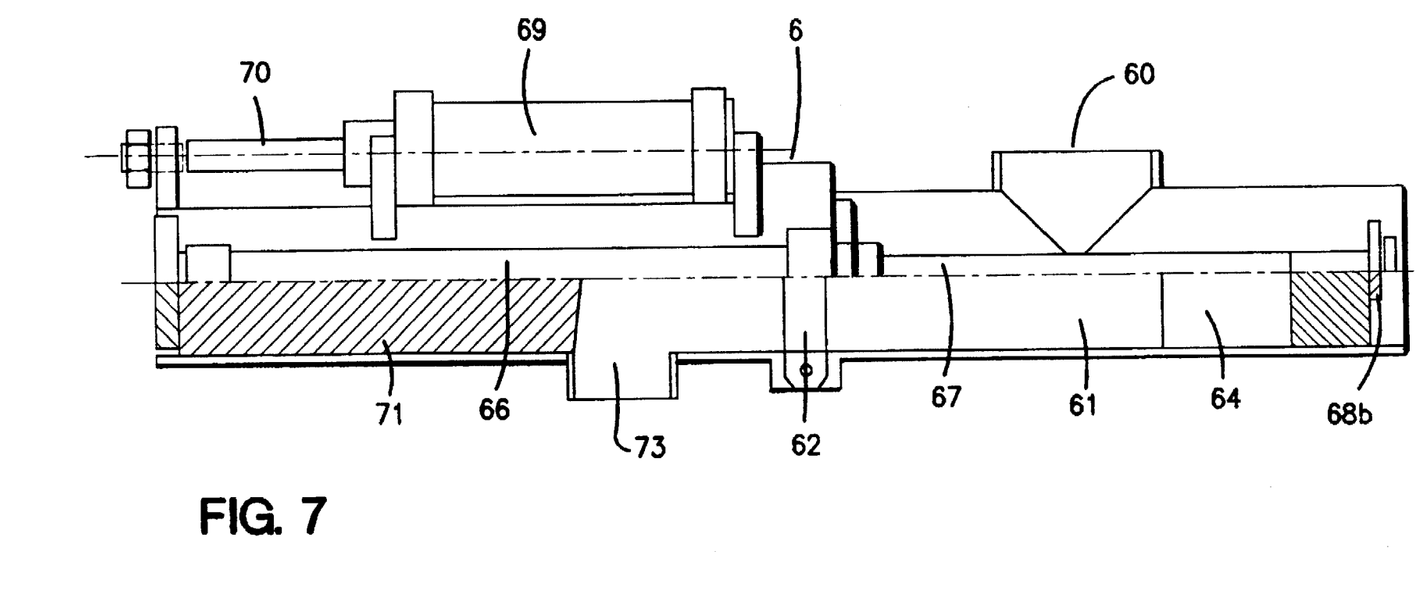
FIG. 7 is a half-section plan view of the juice extracting device in the framework of the machine subject of this invention.
Figure 8:
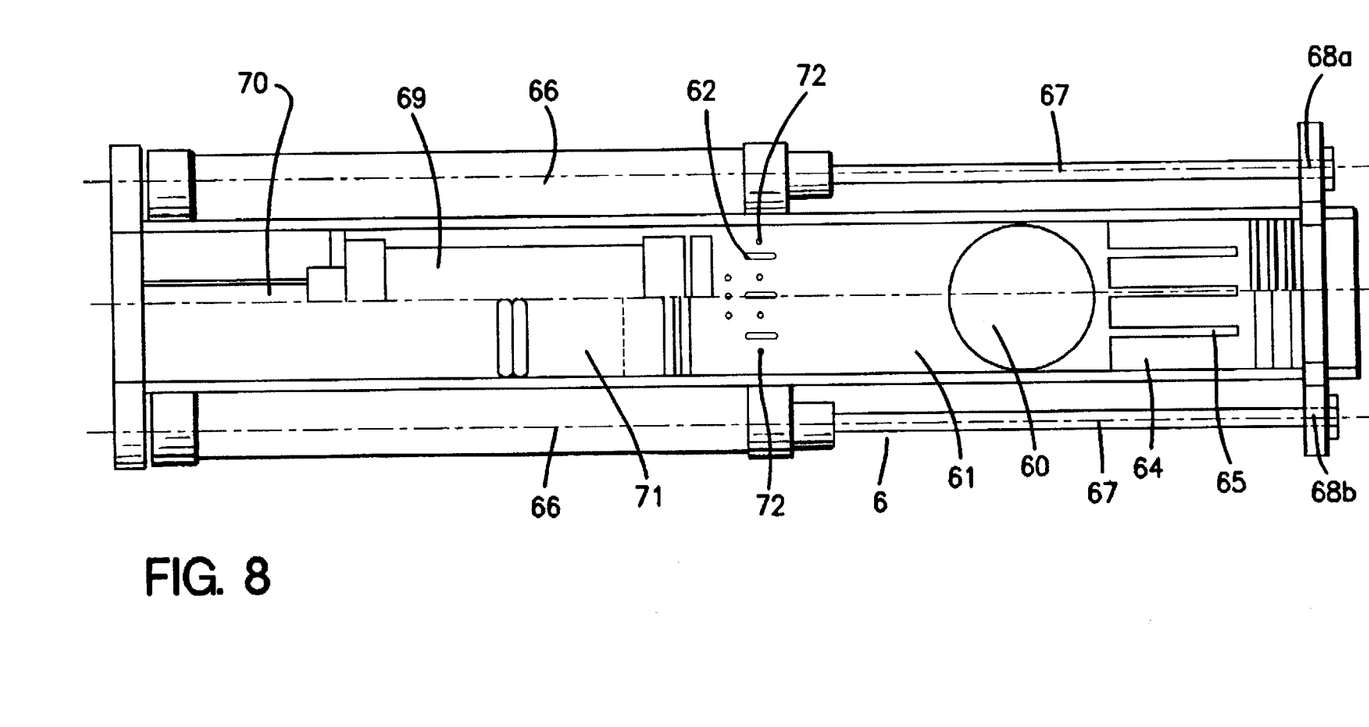
FIG. 8 is a front half-section view of the juice extracting device in the framework of the machine subject of this invention.
Figure 9:
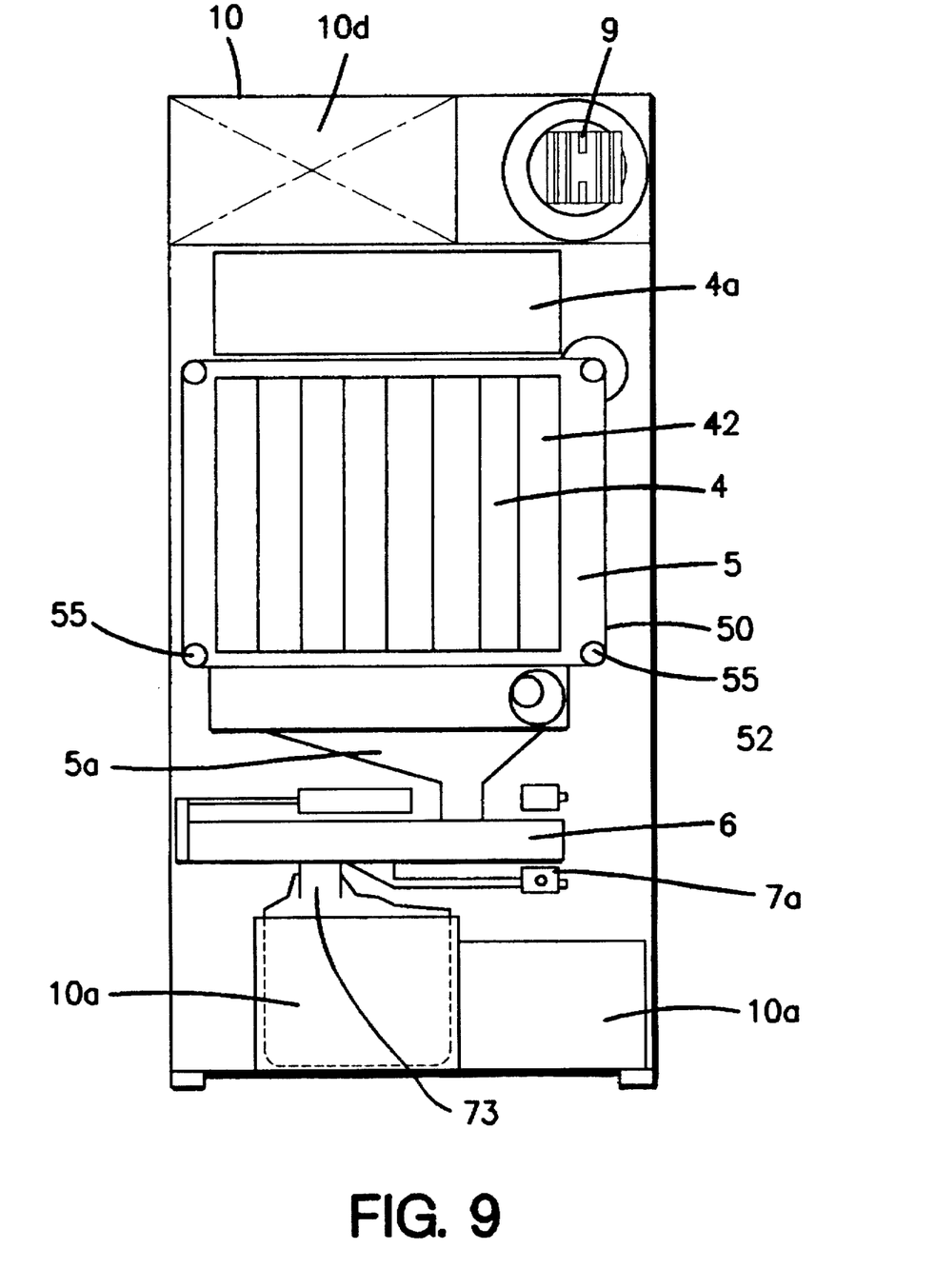
FIG. 9 is a front view of the interior of the casing which covers the devices of the machine subject of this invention, having placed these devices in their permanent locations.

To describe in greater detail the physical equipment specified up to now, FIGS. 5 and 6, which define the dispensing device, and FIGS. 7 and 8, which define the juice extracting device, as well as a general interior view in FIG. 9 in order to observe an aspect of practical performance.

FIGS. 5 and 6 show the dispenser device (5) which will select each of the tubes (42) of the citric unit frame or store. In the said Figures the rotating PVC band (50) can be seen as a blind tensed over some rollers (55) which aid its mobility. The rotating band (50) is responsible for selecting the dropping of citric units one by one through alternate gaps (51) planned on its surface, thus selecting one of the three tubes (42) which exist in each line of the citric unit store (4). To select the rows of citric units, a rotating cylinder has been provided (52), equipped with gaps (56), which will be moved through guide-rails (53) planned to run along the supports (54) situated on either side, achieving the fall of a citric unit from the store to the juice extracting module when the two holes (56) and (51) coincide. Thus, the disposition of the dispensing device towards the citric unit tube selection (42) may be recognized, being of a matrical nature; i.e. a row with citric units is selected to then select a column. This characteristic allows the number of citric units which have been consumed in any given moment to be known, knowing the movements made both by the motors of the rotating band (59) from one position to another, and knowing the movements made by the motor in charge of moving the cylinder (52), as both (50) and (52) are the means of dispensing citric units.

In FIGS. 7 and 8, two views of the juice extracting device (6) have been displayed. In both Figures the citric unit intake opening (60), circular in section, can be seen. The citric unit, falling through the dispenser (4) will enter by the intake opening (60) and fall into the chamber (61).

In the middle area of the chamber (61) cutting blades (62) have been arrayed. To place the citric unit, next to the area where the cutting blades (62) are situated, a piston (64) has been fitted, with a frontal aspect such that, as it reaches along the chamber (61) opposite the blades (62), they fit into slots (65) so that it can thus pass over the obstacle presented by the blades (62) and they can cut the orange with the drive of the piston.

In FIG. 8, two cylinders (66) may be observed, the shafts of which (67) connect solidly with the piston (64), via the connection points (68a and 68b). From the extension of the shaft (67) of the cylinder (66), the piston (64) will be driven closer down the length of the chamber, thus pushing the citric unit towards the blades (62) where, once over the obstacle, with the citric unit now cut, the cylinder (69) situated on the longitudinally opposite position to the piston (64) will extend, the shaft (70) of said cylinder (69) being responsible for driving, via its solid piece (71), the opposite end of the piece of the citric unit, so that under the pressure upon the piece of citric unit by the two pistons (64) and (71) and extraction of citric juice is produced; the said juice will fall through orifices (72) in the base of the chamber (61), which via an channel outside the said juice extracting device (6), carry the juice to the outlet nozzle.

Once the piece of citric unit has had its juice extracted, the piston (71) will draw back, opening behind it an orifice (73) in the base through which the waste will be disposed of by a thrust of the piston (64), this waste falling the a rear waste hopper, defined above.

To provide all the devices with an appearance of unity, as well as a design to present the machine to the public, it has been laid out as in FIG. 9. In the said Figures the prismatic appearance of the machine of the invention can be observed, in which the upper area is occupied by the refrigeration chamber (10) equipped with a refrigeration compressor (10d). Beside them is the air compressor (9), principally for the aspiration and driving of liquids.

On a lower level lies the treatment line for citric units, which enter via an intake hopper (4a), falling from the different tuber (42) arrayed in the store (4). Surrounding the said store (4) is the dispenser (5), equipped with its rotating band (50) supported on rollers (55) and the intake cylinder (52), which, upon selecting a citrus units, will drop it through and discharge hopper (5a) to fall into the juice extracting device (6), where the liquid will pass to the pump (7a) which will drive it out and where the waste will fall into the hopper (9), beside the liquid hopper (10c).

Having sufficiently described the nature of this invention, as well as a way of putting it into practice, all that remains to be done is to add that, as a whole and in its components, it is possible to introduce changes of materials, as long as they do not substantially alter the characteristics claimed below.

I claim:

1. A self-contained automatic citric juice extracting and dispensing machine for producing freshly squeezed citrus juice, said citric juice extracting and dispensing machine comprising:
   a citric fruit store for storing citric fruits;
   a dispenser for dispensing a certain number of fruits per selection from the citric fruit store;
   a citric juice extracting device, said dispenser feeding citric fruits to said citric juice extracting device;
   a fluid pump, fitted into an outlet of the juice extracting device, for pumping juice produced by the citric juice extracting device through the outlet and into a cup placed to receive said juice;
   a discharge hopper for waste collection, said fluid pump disposing remains of the citric fruits from the juice extracting device into said discharge hopper, so that it is possible to clean chambers and piping dirtied by a juice extracting operation, during inactivity of said juice extracting operation; and
   an electronic control comprising a microprocessor system using software, for controlling operation of the citric fruit store, the dispenser, the citric juice extracting device, and the fluid pump, and issuing signals to execute a cleaning cycle during said inactivity of said juice extracting operation.

2. A self-contained automatic citric juice extracting and dispensing machine, as in claim 1, wherein the citric fruit store comprises a metal frame for supporting a lattice of storage tubes, said storage tubes being arranged in rows and columns in staggered form, each storage tube of said lattice of storage tubes containing a number of citric fruits, the lattice of tubes being held together by a contact adhesive to form a compact block.

3. A self-contained automatic citric juice extracting and dispensing machine, as in claim 1, wherein the dispenser comprises an endless, flat PVC band and a motor rotating said PVC band, said motor being one of a continuous and step-by-step type, said PVC band having a lower lengthwise stretch in contact with storage tubes, said PVC band having drilled holes in a surface thereof for allowing the citric fruits to pass from the storage tubes, said citric fruits passing through the dispenser to said discharge hopper, when said discharge hopper aligns with the drilled holes in a cylinder with horizontal gaps, said motor moving said cylinder both rotationally and longitudinally along guide-rails, said guide-rails axially supporting ends of said cylinder, said motor placing said cylinder below a row of said storage tubes, whereby overlap of the drilled holes and the gaps selects a row and one of the storage tubes of said row, so that storage tube contents of citric fruits fall through said discharge hopper, which places said contents in the juice extracting device.

4. A self-contained automatic citric juice extracting and dispensing machine, as in claim 1, wherein the juice extracting device comprises:
   a vertical intake, through which one of the citric fruits coming from the citric fruit dispenser enters into a chamber;
   a lengthwise running first piston, driven by two laterally situated first cylinders, said first cylinders having respective shafts, the shafts being connected solidly with said first piston, whereby the first piston is capable of pushing the citric fruit as the first cylinders extend simultaneously respective shafts towards a central area of the chamber;

blades located in the central area, whereby said blades block passage of the citric fruit and cut the citric fruit as it is pushed by the first piston, said first piston having slots in its face to ensure complete section of the citric fruit, producing a cut citric fruit;

a second cylinder having a shaft, said second cylinder situated at a top of the chamber and activated as the blades cut the citric fruit, whereby as said second cylinder extends, its shaft moves a second piston in a part of the chamber opposite the first piston, to press the cut citric fruit by compression of both pistons;

juice outlet orifices situated in a top part of the chamber at the height of the blades to permit juice to flow therethrough; and a lower waste disposal orifice for the removal of remains and waste, whereby removal is carried out after the shaft of the second cylinder is withdrawn and by an additional extension of the shafts of the first cylinders, which involves an extended travel of the first piston, pushing remains of the citric fruit into the waste disposal orifice.

5. A self-contained automatic citric juice extracting and dispensing machine, as in claim 1, further comprising a chamber of the juice extracting device;

a means for injection of water for performing said cleaning cycle, said water injection means cleaning a camera, a front surface of the pistons, juice outlet orifices, passage through the fluid pump and respective piping;

an exterior tank;

a three-way electrically operated valve situated a number of centimeters before the outlet from the machine, whereby switching of said three-way valve channels water to said exterior tank.

6. A self-contained automatic citric juice extracting and dispensing machine, as in claim 1, further comprising a refrigeration chamber placed as a module before the outlet inside the machine.

* * * * *

UNITED STATES PATENT AND TRADEMARK OFFICE
CERTIFICATE OF CORRECTION

PATENT NO. : 5,671,663
DATED : September 30, 1997
INVENTOR(S) : Jose Angel ALVAREZ FERNANDEZ It is certified that error appears in the above-indentified patent and that said Letters Patent is hereby corrected as shown below:

On the cover page, in the title, Item 54, change "SELF-CONTAINED AUTOMATIC CITRIC JUICE EXTRACTING AND DISPENSING" to --SELF-CONTAINED AUTOMATIC CITRIC JUICE EXTRACTING AND DISPENSING MACHINE--.

Column 1, lines 1 and 2, change the title "SELF-CONTAINED AUTOMATIC CITRIC JUICE EXTRACTING AND DISPENSING" to --SELF-CONTAINED AUTOMATIC CITRIC JUICE EXTRACTING AND DISPENSING MACHINE--.

Signed and Sealed this

Second Day of December, 1997

*Attest:*

BRUCE LEHMAN

*Attesting Officer*  Commissioner of Patents and Trademarks